US012605639B2

(12) United States Patent
Kittle

(10) Patent No.: US 12,605,639 B2
(45) Date of Patent: Apr. 21, 2026

(54) RIDE-ON TOY WITH INFLATABLE PORTION

(71) Applicant: Goldstar Innovations LLC, Brooklyn, NY (US)

(72) Inventor: David Kittle, Charlotte, NC (US)

(73) Assignee: Goldstar Innovations LLC, Brooklyn, NY (US)

( * ) Notice: Subject to any disclaimer, the term of this patent is extended or adjusted under 35 U.S.C. 154(b) by 235 days.

(21) Appl. No.: 17/943,321

(22) Filed: Sep. 13, 2022

(65) Prior Publication Data

US 2024/0082741 A1 Mar. 14, 2024

(51) Int. Cl.
*A63G 19/20* (2006.01)
*B60K 7/00* (2006.01)
*B62K 9/00* (2006.01)

(52) U.S. Cl.
CPC ............ *A63G 19/20* (2013.01); *B60K 7/0007* (2013.01); *B62K 9/00* (2013.01)

(58) Field of Classification Search
CPC ......... A63G 19/20; B60K 7/0007; B60K 9/00
USPC ........................................................ 180/65.1
See application file for complete search history.

(56) References Cited

U.S. PATENT DOCUMENTS

| | | | |
|---|---|---|---|
| D192,932 S | 5/1962 | Gurr | |
| 5,335,436 A * | 8/1994 | Gurr | G09F 19/08 446/226 |

| | | | | |
|---|---|---|---|---|
| 6,039,327 A * | 3/2000 | Spector | | A63G 19/18 280/1.13 |
| 6,408,967 B1 * | 6/2002 | Huntsberger | | B62K 9/00 239/289 |
| 6,447,361 B1 * | 9/2002 | Akiyama | | A63H 27/10 137/625.21 |
| 6,532,693 B2 * | 3/2003 | Sides | | A01M 31/06 43/2 |
| 6,659,837 B1 | 12/2003 | Lieberman | | |
| 6,786,793 B1 * | 9/2004 | Wang | | A63H 27/10 446/176 |
| 7,214,119 B2 | 5/2007 | Lucas et al. | | |
| 7,356,951 B2 * | 4/2008 | Spielberger | | G09F 19/08 446/178 |
| 7,367,599 B2 † | 5/2008 | Thomson | | |
| 8,469,369 B1 * | 6/2013 | McCarthy | | B62K 9/00 280/282 |
| 8,567,803 B2 * | 10/2013 | Bao | | B62K 9/00 297/215.11 |
| 8,635,794 B1 * | 1/2014 | Thigpen | | A63H 3/52 40/539 |
| 8,827,279 B1 * | 9/2014 | Clark | | A63H 17/26 280/1.206 |

(Continued)

FOREIGN PATENT DOCUMENTS

| | | | |
|---|---|---|---|
| AU | 2001100029 A4 | 8/2001 | |
| CN | 201249033 Y † | 6/2009 | |

(Continued)

*Primary Examiner* — Hau V Phan

(74) *Attorney, Agent, or Firm* — Tarter Krinsky & Drogin LLP

(57) ABSTRACT

A children's ride-on toy with an inflatable body portion that is inflated by an integrated air blower unit. The inflatable body portion can be releasably attached to the ride-on toy, such that it is interchangeable and allows children to customize their ride-on with a character or animal of their choice.

20 Claims, 8 Drawing Sheets

(56) References Cited

U.S. PATENT DOCUMENTS

| | | | | |
|---|---|---|---|---|
| D825,683 | S | † | 8/2018 | Liu |
| D843,484 | S | | 3/2019 | Rodriguez Garcia |
| D847,909 | S | | 5/2019 | Chen |
| 10,713,981 | B2 | * | 7/2020 | de Grasse ............... G09F 19/08 |
| D897,764 | S | | 10/2020 | Goulet Dubois |
| 11,548,583 | B2 | * | 1/2023 | Monzidelis .............. B62K 9/02 |
| D981,636 | S | | 3/2023 | Zeng |
| D994,067 | S | | 8/2023 | Milhouse et al. |
| D1,018,226 | S | | 3/2024 | Liu |
| D1,024,219 | S | | 4/2024 | Swan et al. |
| D1,048,206 | S | | 10/2024 | Chen |
| 2002/0094746 | A1 | * | 7/2002 | Harlev ................... A63H 3/001 |
| | | | | 446/178 |
| 2006/0098421 | A1 | * | 5/2006 | Fireman ................ F04D 29/005 |
| | | | | 362/96 |
| 2015/0184844 | A1 | † | 7/2015 | Zhang |
| 2018/0174499 | A1 | * | 6/2018 | De Grasse ............... A63H 3/06 |
| 2018/0178886 | A1 | * | 6/2018 | Kohnsen ................. B63B 32/51 |
| 2018/0264372 | A1 | * | 9/2018 | Bernbaum ............. A63G 19/00 |
| 2020/0129876 | A1 | * | 4/2020 | Autore ................... A63H 27/10 |
| 2022/0185416 | A1 | * | 6/2022 | Monzidelis .............. B62K 9/00 |
| 2023/0132134 | A1 | † | 4/2023 | Hoeting et al. |

FOREIGN PATENT DOCUMENTS

| | | | | |
|---|---|---|---|---|
| CN | 201305790 | Y | † | 9/2009 |
| EP | 1935465 | B1 | | 6/2010 |
| GB | 2453715 | A | | 4/2009 |
| JP | 2020006037 | A | | 1/2020 |

* cited by examiner
† cited by third party

RIDE-ON TOY WITH INFLATABLE PORTION

FIELD OF THE INVENTION

The disclosure relates to the field of children's ride-on toys and, more specifically, to a children's ride on vehicle with an inflatable body portion.

BACKGROUND OF THE INVENTION

The invention relates to the field of children's ride-on toys and, more specifically, to a children's ride on vehicle with an inflatable body portion.

Various types of ride-on vehicles for children are well-known in the art, including a bicycle, wagon, car, scooter, rocker, or the like. However, traditional and conventional ride-on toys generally do not have the ability to incorporate a removable decorative portion that extends from the toy due to weight constraints and/or safety concerns. There is accordingly a need for ride-on toys with novel features that permit the addition of a decorative element without significant added weight to allow for the customization and/or enhancement of otherwise-standard ride-on toys.

SUMMARY OF THE INVENTION

The object of the present disclosure is to provide a children's ride-on toy with an inflatable body portion that is inflated by an integrated air blower unit. The inflatable body portion can be releasably attached to the ride-on toy, such that it is interchangeable and allows children to customize their ride-on with a character or animal of their choice.

According to an embodiment of the present disclosure, a ride-on toy can comprise a base unit comprising one or more wheels and an air blower unit. The base unit can further comprise a steering mechanism configured to steer and control the direction of the ride-on toy. One or more wheels of the base unit can be driven by a motor, which may be independent from a motor driving the air blower unit.

The ride-on toy can also comprise an inflatable body portion removably attached to the base unit. The inflatable body portion can comprise an opening through which the inflatable body portion is filled with air and is configured to extend from the base unit when pressurized. The air blower unit is configured to continuously supply the inflatable body portion with air pressure for inflation. The air blower unit can be disposed within the base unit. In such embodiments, the base unit can further comprise an opening through which air flow is directed from the air blower unit into the opening of the inflatable body portion.

The inflatable body portion can be releasably attached to the base unit in a variety of ways. The opening of the base unit can comprise a flange externally protruding from the surface of the base unit, which is configured to receive the opening of the inflatable body portion. The ride-on toy can further comprise a frame configured to removably attach to the base unit and comprises an opening aligned with the opening of the base unit. In such embodiment, the opening of the frame can further comprise a flange configured to receive the opening of the inflatable body portion.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION OF THE INVENTION

Embodiments of the present invention will now be described with reference to the above-identified drawings. However, the drawings and the description herein are not intended to limit the scope of the claims. It will be understood that various modifications of the present description are possible without departing from the spirit of the invention. Also, features described herein may be omitted, additional features may be included, and/or features described herein may be combined in a manner different from the specific combinations recited herein, all without departing from the spirit of the invention.

Figure 1:
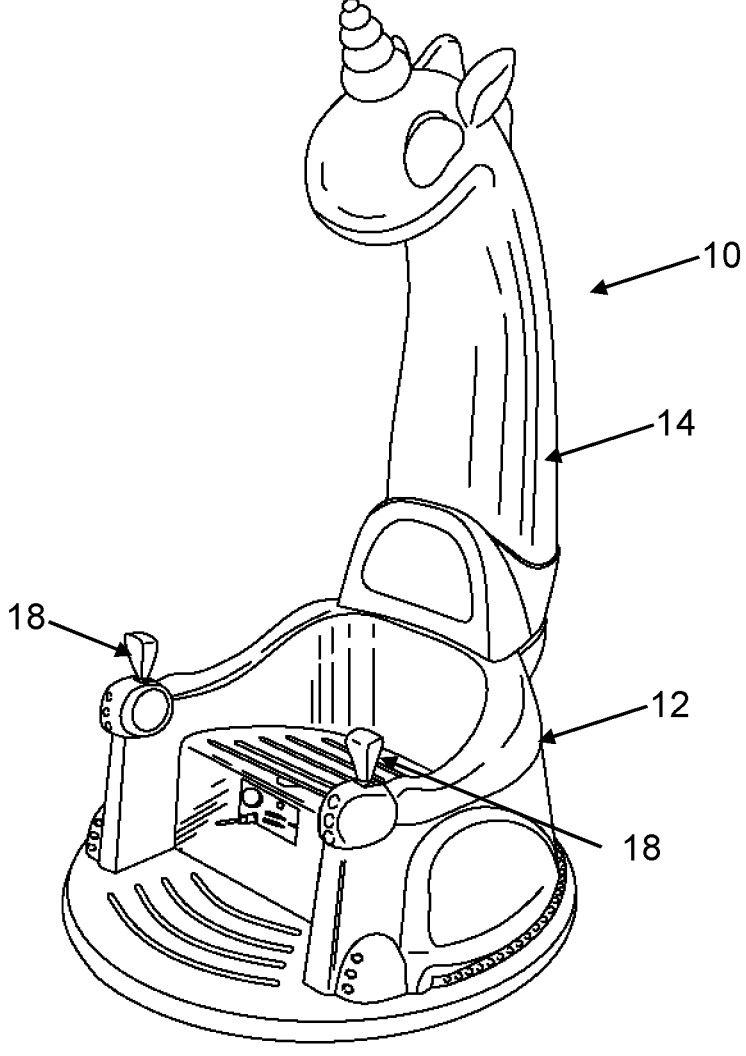
FIG. 1 is a perspective view of a children's ride-on toy according to one embodiment of the disclosure.

FIG. 1 shows a perspective view of a children's ride-on toy 10 according to an exemplary embodiment of the invention. In certain embodiments, ride-on toy 10 is generally comprised of a base unit 12 configured to receive one or more inflatable body portions 14.

It will be understood that the ride-on toy 10 can be any ride-on toy, including but not limited to a bicycle, wagon, car, scooter, rocker, and the like, and can be motorized (e.g., battery-powered) or manually operated (e.g., by pedal, pull, push). In certain embodiments of the invention, and as shown, for example, in FIGS. 1-8, ride-on toy 10 is a motorized bumper car.

In certain embodiments, base unit 12 of ride-on toy 10 is comprised of a durable material (e.g., hard plastic, metal, or composite structure having suitable strength to accommodate and support the weight of at least one child).

Figure 2:
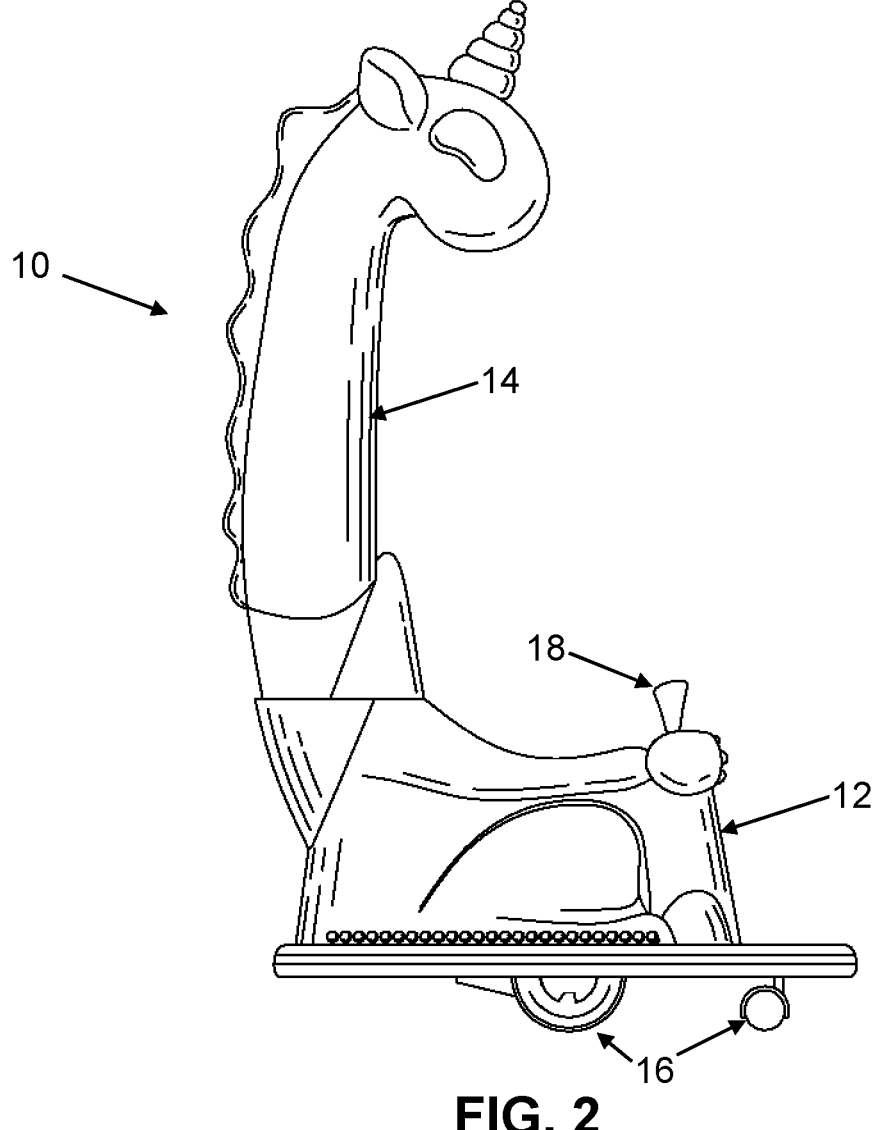
FIG. 2 is a left side view of the children's ride-on toy of FIG. 1.
Figure 3:
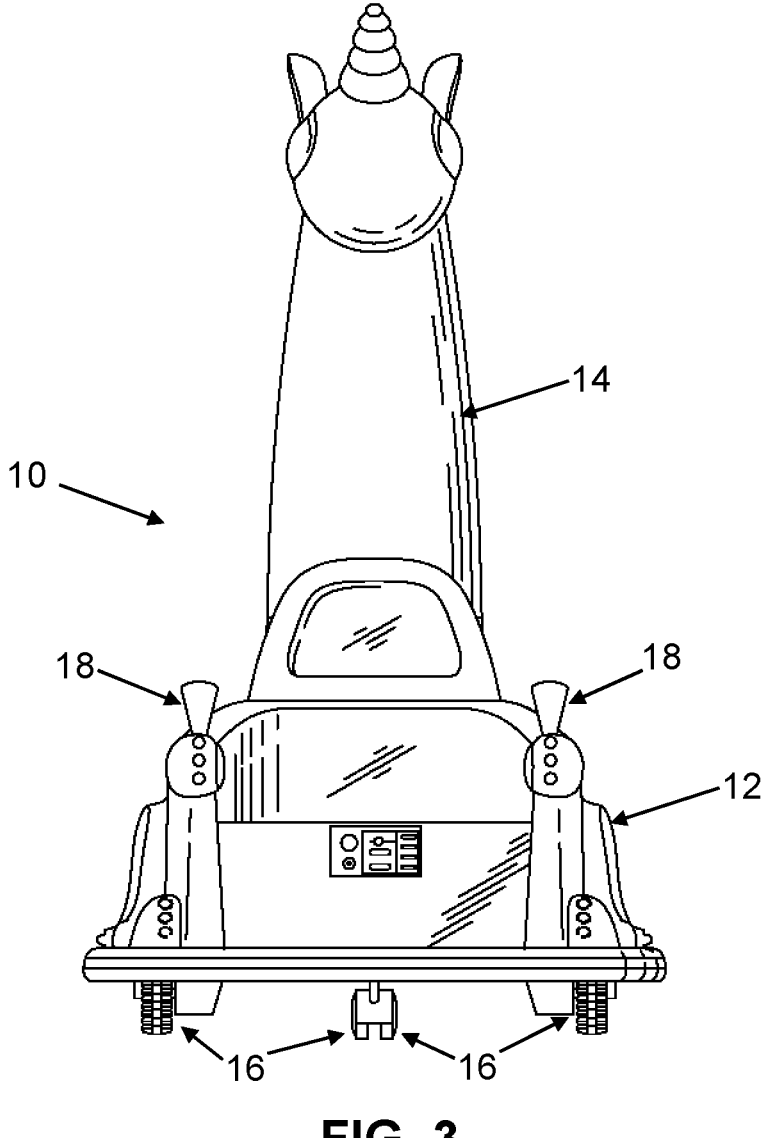
FIG. 3 is a front side view of the children's ride-on toy of FIG. 1.
Figure 4:
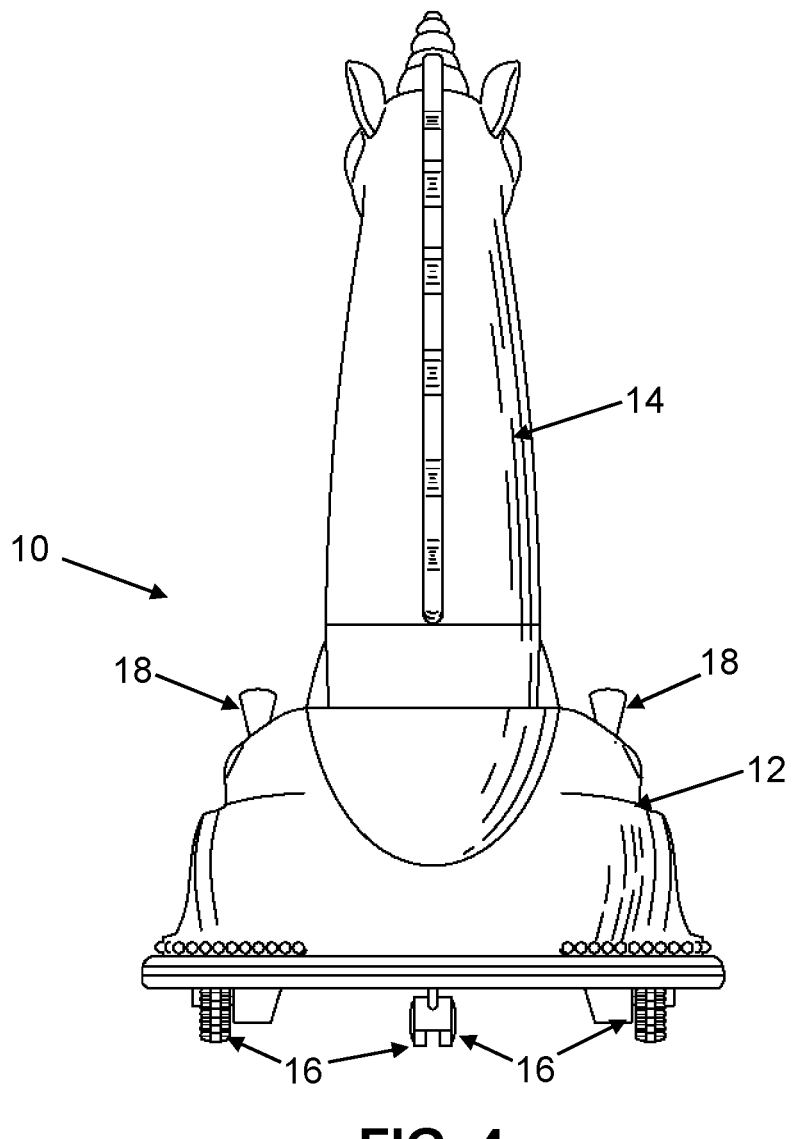
FIG. 4 is a back side view of the children's ride-on toy of FIG. 1.
Figure 5:
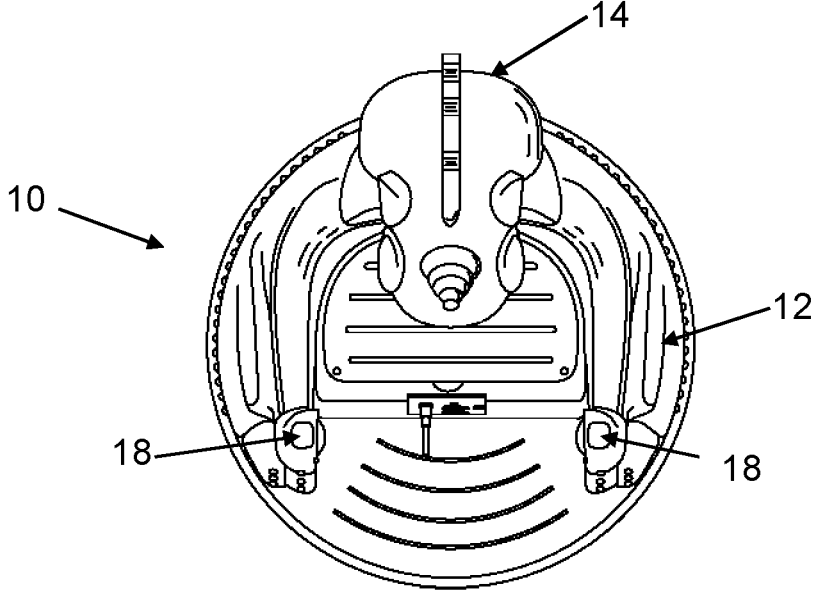
FIG. 5 is a top view of the children's ride-on toy of FIG. 1.
Figure 6:
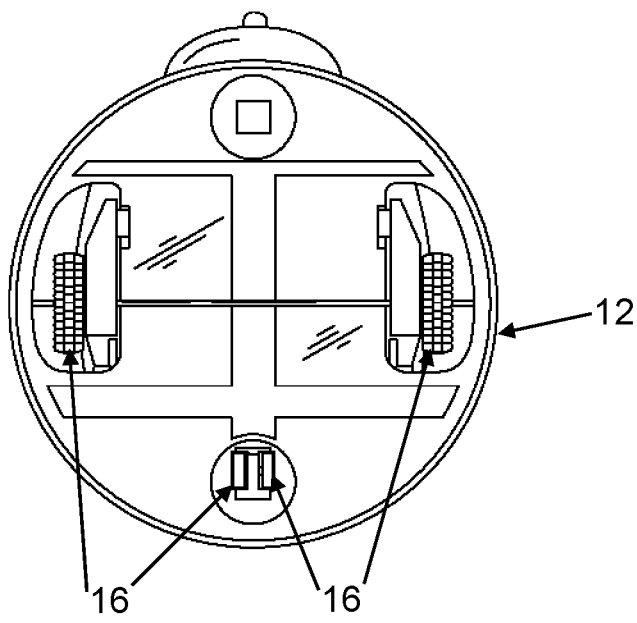
FIG. 6 is a bottom view of the children's ride-on toy of FIG. 1.

Referring to the left, front, and back views of ride-on toy 10 in FIGS. 2-4, respectively, in certain embodiments, ride-on toy 10 comprises one or more wheels 16. In certain embodiments, the one or more wheels 16 can be coupled to, and rotationally driven by, a drivetrain (i.e., drive wheels). In such embodiments, the one or more wheels 16 can be driven by a motor. In certain embodiments, the one or more wheels 16 are not coupled to the rotational output of a drivetrain and rotate freely with movement of ride-on toy 10 (i.e., non-driven wheels). In certain embodiments, one or more wheels 16 of ride-on toy 10 can be a combination of one or more drive wheels (e.g., wheels coupled to the rotational output of a drivetrain) and one or more non-driven wheels (e.g., rotate freely with movement of ride-on toy 10).

In certain embodiments, ride-on toy 10 further comprises steering mechanism 18 configured to enable a user to steer and control the direction of ride-on toy 10. In the illustrated embodiment in FIGS. 1-8, steering mechanism 18 is one or more joysticks. It will be understood that other suitable structures (e.g., handlebars, steering wheel) can be used.

In certain embodiments, ride-on toy 10 can be wirelessly controlled and operated (e.g., configured to speed up, stop, slow down, and/or control direction) by a remote control in communication with the steering mechanism and drive wheels of ride-on toy 10.

In certain embodiments, base unit 12 of ride-on toy 10 further comprises a light source (e.g., LED lights). In certain embodiments, base unit 12 of ride-on toy 10 further comprises speakers to generate various sounds effects and/or music. In certain embodiments, the speakers included in base unit 12 of ride-on toy 10 can use Bluetooth technology to become an audio output source when paired with a Bluetooth capable device.

In certain embodiments, ride-on toy 10 further comprises one or more inflatable body portions 14 configured to be received by base unit 12 and capable of being filled, at least partially, with air. It will be understood that the inflatable body portion 14 of the ride-on toy 10 can be any form, shape, size, or color. For example, inflatable body portion 14 can be designed to resemble an animal, character, or the like. As shown, for example, in FIGS. 1-8, inflatable body portion 14 of ride-on toy 10 is a unicorn.

In certain embodiments, inflatable body portion 14 is comprised of a thin, sheet-like material (e.g., polyester, plastic, elastic, latex, cotton, nylon), which is lightweight and flexible and able to contain air so as to obtain a balloon-like structure. In certain embodiments, the material comprising inflatable body portion 14 is sufficiently translucent to allow light transmission from a light source (e.g., LEDs) mounted on base unit 12 of toy ride-on 10.

In certain embodiments, inflatable body portion 14 comprises an opening through which air flow can be directed into an interior cavity. In certain embodiments, an air blower unit is configured to provide inflation to the interior cavity of the inflatable body portion 14. The air blower unit can be a conventional air blower pump assembly, having a fan wheel directly driven by a motor, inlet vent to receive external air, and output vent to provide an outward flow of air.

In certain embodiments, the air blower unit is contained within base unit 12 of ride-on toy 10. In such embodiments, base unit 12 of ride-on toy 10 can further comprise one or more openings 20 through which air flow is directed from the outlet vent of the air blower unit into inflatable body portion 14, such that inflatable body portion 14 projects away from base unit 12 when pressurized. The air blower unit continuously, or repetitiously, pressurizes inflatable body portion 14 to keep inflatable body portion 14 inflated.

It will be understood that the opening of inflatable body portion 14 can attach to base unit 12 in a multitude of ways.

Figure 7:
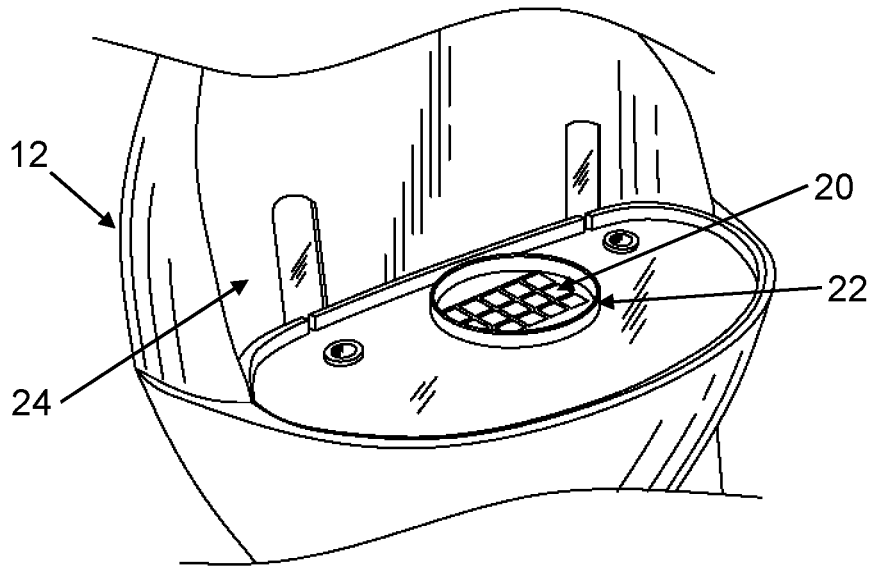
FIG. 7 is a back perspective view of the children's ride-on toy of FIG. 1 without an inflatable body portion.

For example, in certain embodiments, the opening of inflatable body portion 14 can be configured directly secure to base unit 12. In embodiments, the opening of inflatable body portion 14 is configured to cover opening 20 to allow airflow from the air blower unit to the interior cavity of inflatable body portion 14. In embodiments, the opening of inflatable body portion 14 can be removably attached to base unit 12 with one or more fasteners (e.g., tabs, screws, glue, clips, edges, bolts, adhesive, elastic, ties). In embodiments, the opening of inflatable body portion 14 can be shaped and sized to conform to the shape and size of a portion of base unit 12 (e.g., a recessed portion 24 as shown in FIG. 7).

In other embodiments, the opening of inflatable body portion 14 can be configured to directly attach to opening 20 of base unit 12. As shown in FIG. 7, the one or more openings 20 of base unit 12 can further comprise flange 22 externally protruding from base unit 12. Flange 22 can be configured to receive and engage with the opening of inflatable body portion 14. In such embodiments, the opening of inflatable body portion 14 can be secured to flange 22 with one or more fasteners (e.g., tabs, screws, glue, clips, edges, bolts, adhesive, elastic, ties) or through threaded engagement, frictional engagement, or the like. In embodiments, the opening of inflatable body portion 14 can be of the same size and shape as flange 22 to provide a secure attachment.

Figure 8:
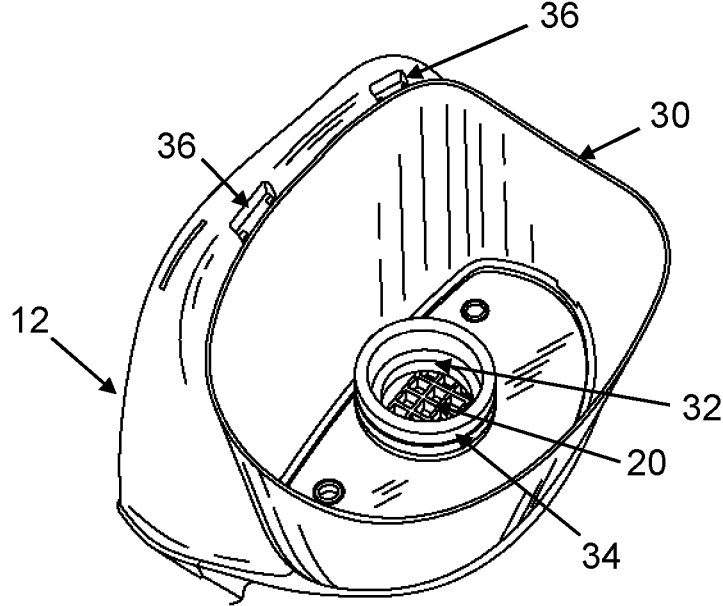
FIG. 8 is a back perspective view of the frame of an inflatable body portion of the children's ride-on toy of FIG. 1.

In other embodiments, as shown in FIG. 8, ride-on toy 10 can further comprise frame 30 to contain and support inflatable body portion 14. In such embodiments, frame 30 can be shaped to engage with and seal against a portion of base unit 12 (e.g., a recessed portion 24 as shown in FIG. 7). In embodiments, frame 30 can comprise an opening 32 aligned with opening 20 of base unit 12 to allow airflow from the air blower unit to the interior cavity of inflatable body portion 14. In such embodiments, opening 32 of frame 30 can further comprise flange 34 to engage with the opening of inflatable body portion 14 with one or more fasteners (e.g., tabs, screws, glue, clips, edges, bolts, adhesive, elastic, ties) or through threaded engagement, frictional engagement, or the like. In certain embodiments, frame 30 can be removably attached to base unit 12 with one or more fasteners (e.g., tabs, screws, glue, clips, edges, bolts, adhesive). In the exemplary embodiment shown in FIG. 8, tabs 36 of frame 30 engage and interconnect with slots on base unit 12 such that inflatable body portion 14 is secured to base unit 12.

When it is desired to use ride-on toy 10 without inflatable body portion 14, inflatable body portion 14 can be removed from base unit 12. Inflatable body portion 14 can also be interchangeable with another inflatable body portion 14.

In certain embodiments in which a motor drives one or more wheels 16, such motor is separate and independent from the motor configured to drive the fan wheel of the air blower unit, permitting ride-on toy 10 to be used without inflatable body portion 14.

Having described the subject matter of the application with regard to specific embodiments, it is to be understood that the description is not meant as a limitation since further modifications and variations may be apparent or may suggest themselves to those skilled in the art. It is intended that the present application cover all such modifications and variations.

What is claimed is:

1. A ride-on toy comprising:
   a base unit comprising one or more wheels;
   an air blower unit;
   an inflatable body portion, the inflatable body portion comprising an opening through which the inflatable body portion is filled with air and is configured to extend from the base unit when pressurized;
   wherein the air blower unit continuously supplies the inflatable body portion with air pressure for inflation; and
   wherein the inflatable body portion is configured to maintain an inflated state using air pressure continuously supplied by the air blower unit while permitting air to escape at a rate sufficient to prevent overinflation.

2. The ride-on toy of claim 1, wherein the inflatable body portion is removably attached to the base unit.

3. The ride-on toy of claim 1,
  wherein the air blower unit is disposed within the base unit; and
  wherein the base unit further comprises an opening through which air flow is directed from the air blower unit into the opening of the inflatable body portion.

4. The ride-on toy of claim 3, wherein the opening of the base unit comprises a flange configured to receive the opening of the inflatable body portion.

5. The ride-on toy of claim 3, further comprising a frame configured to removably attach to the base unit, wherein the frame comprises an opening aligned with the opening of the base unit.

6. The ride-on toy of claim 5, wherein the opening of the frame further comprises a flange configured to receive the opening of the inflatable body portion.

7. The ride-on toy of claim 1, wherein the base unit further comprises a steering mechanism configured to steer and control a direction of the ride-on toy.

8. The ride-on toy of claim 1, wherein the one or more wheels are driven by a motor.

9. The ride-on toy of claim 8, wherein the motor driving the one or more wheels is independent from a driving the air blower unit.

10. The ride-on toy of claim 8, wherein the motor and the steering mechanism can be wirelessly operated.

11. The ride-on toy of claim 1, wherein the base unit further comprises one or more light source and one or more speaker.

12. A ride-on toy comprising:
  a base unit comprising one or more wheels;
  an air blower unit;
  wherein the air blower unit is disposed within the base unit;
  wherein the base unit further comprises an opening adapted to releasably receive an inflatable body portion having an opening and through which air flow is continuously directed from the air blower unit into the opening of the inflatable body portion; and
  wherein the inflatable body portion is configured to maintain a fully inflated state from air pressurization continuously provided by the air blower unit, while allowing air flow to exit the inflatable body portion at a rate that prevents overinflation.

13. The ride-on toy of claim 12, wherein the inflatable body portion is filled with air and configured to extend from the base unit when pressurized.

14. The ride-on toy of claim 12, wherein the opening of the base unit comprises a flange configured to receive the opening of the inflatable body portion.

15. The ride-on toy of claim 12, further comprising a frame configured to removably attach to the base unit, wherein the frame comprises an opening aligned with the opening of the base unit.

16. The ride-on toy of claim 15, wherein the opening of the frame further comprises a flange configured to receive the opening of the inflatable body portion.

17. The ride-on toy of claim 12, wherein the one or more wheels are driven by a motor and wherein the motor driving the one or more wheels is independent from a motor driving the air blower unit.

18. The ride-on toy of claim 12, wherein the base unit further comprises one or more light source and one or more speaker.

19. The ride-on toy of claim 12, wherein the base unit further comprises a steering mechanism configured to steer and control a direction of the ride-on toy.

20. The ride-on toy of claim 19, wherein the motor and the steering mechanism can be wirelessly operated.

* * * * *